United States Patent [19]

Averbach

[11] Patent Number: 5,130,150
[45] Date of Patent: Jul. 14, 1992

[54] EDIBLE MOISTURE BARRIER

[75] Inventor: Benjamin L. Averbach, Belmont, Mass.

[73] Assignee: Megafoods, Inc., Dover, Mass.

[21] Appl. No.: 633,663

[22] Filed: Dec. 26, 1990

[51] Int. Cl.$^5$ .............................................. A21D 15/08
[52] U.S. Cl. .......................................... 426/99; 426/94; 426/302; 426/304
[58] Field of Search .................... 426/89, 99, 302, 304, 426/310, 94

[56] References Cited

U.S. PATENT DOCUMENTS

| | | | |
|---|---|---|---|
| 3,293,043 | 12/1966 | Matz et al. | 99/92 |
| 3,526,515 | 9/1970 | Werbin et al. | 99/86 |
| 4,401,681 | 8/1983 | Dahle | 426/94 |
| 4,603,051 | 7/1986 | Rubenstein et al. | 426/138 |
| 4,687,669 | 8/1987 | Moritaka et al. | 426/309 |
| 4,710,228 | 12/1987 | Seaborne et al. | 106/218 |
| 4,880,646 | 11/1989 | Lew et al. | 426/93 |
| 4,915,971 | 4/1990 | Fennema et al. | 426/578 |

FOREIGN PATENT DOCUMENTS 8600501  1/1986  PCT Int'l Appl. .

OTHER PUBLICATIONS

S. Gilbert in *Food Preservation by Moisture Control;* Elsevier Applied Science Publishers, Ltd., London (1988).
Kester et al., *Food Technology,* (Dec. 1986); "Edible films and coatings: a review".
Kester et al. *Journal of Food Science,* vol. 54, No. 6 (1989) "An edible film of lipids and cellulose ethers; Barrier . . . ".
Greener et al., *Journal of Food Science,* vol. 54, No. 6 (1989); "Barrier properties and surface characteristics . . ".
Greener et al. *Journal of Food Science,* vol. 54, No. 6 (1989); "Evaluation of edible, bilayer films for use . . . ".

*Primary Examiner*—Jeanette Hunter
*Assistant Examiner*—Helen Pratt
*Attorney, Agent, or Firm*—Lahive & Cockfield

[57] ABSTRACT

A thin, edible moisture barrier consists essentially of oleaginous material and wax, and has a permeability value of less than $0.07 \times 10^{-9}$ gm cm$^{-2}$ (cm Hg)$^{-1}$ cm. The barrier can be applied as a molten solution to a food product surface, cooling rapidly to form a continuous barrier that prevents the migration of moisture into, out of, or between components of the food product.

26 Claims, 2 Drawing Sheets

EDIBLE MOISTURE BARRIER

BACKGROUND OF THE INVENTION

The present invention relates to an edible coating for food products. More particularly, this invention relates to an edible moisture barrier capable of inhibiting the migration of moisture through the surface of a food product. The moisture barrier is particularly useful in preventing moisture migration within a multi-component food product between components having different water activities.

For many food products, particularly cooked food products, critical levels of moisture must be maintained if the product is to exhibit optimum quality and acceptable safety. Moisture migration in finished food products can seriously compromise quality, stability and safety. For example, the loss of moisture out of food products having a relatively high moisture content, such as brownies or cookies, dries out these foods and they are perceived as having lost their freshness. Similarly, absorption of moisture from the surrounding atmosphere into a food product normally having a low moisture content, such as a cracker, can cause the food product to become soft, losing the desired crispness associated with the fresh product. In addition, many chemical and enzymatic deteriorative reactions proceed at rates partially governed by the moisture contents of foods. Excessive rates of these reactions can promote deleterious changes in the flavor, color, texture, and nutritive value of food products.

In a multi-component food product, particularly whose various components have different moisture contents and water activities such as, for example, a glazed doughnut, a sandwich, or a pie composed of a pie crust and a filling, the moisture can migrate between adjacent components, altering the character of several of the food product's components. For example, in a glazed doughnut, the glazing can absorb water from the fried dough body, becoming sticky and moist. At the same time, the dough body loses moisture, becoming dry.

In addition to compromising the quality of finished food products, moisture migration can hinder production and distribution of food products. For example, as the glazing on a doughnut absorbs moisture from the fried doughnut, the glazing deteriorates and becomes sticky.

Of the various methods of affecting moisture migration known in the art, coating the food product with an edible moisture barrier holds much promise. To have utility, the barrier should have a low permeability to moisture, in order to prevent the migration of water or water vapor. In addition, the barrier should cover the food surface completely, including crevices and adhere well to the food product surface. The moisture barrier should be sufficiently strong, soft and flexible to form a continuous surface that will not crack upon handling, yet can be easily penetrated during consumption. In addition, the barrier film's organoleptic properties of taste, after taste and mouth feel should be imperceptible, and there should be no awareness of the barrier when it is being bitten through. Finally, the moisture barrier should be easy to manufacture and easy to use.

Because lipids, such as, for example, oils, fats and waxes, are composed of water insoluble molecules capable of forming a water impervious structure, they have been investigated for use in moisture barrier films. With respect to oleaginous materials (fats and oils), it has been shown that, unless an undesirably thick coating is used, the barrier is ineffective. Wax barriers have disadvantages as moisture barriers because they tend to crack upon handling or with changes in temperatures. Accordingly, many of the barriers in the art use a water-impermeable lipid in association with hydrocolloids (polysaccharides) such as alginate, pectin, carrageenan, cellulose derivatives, starch, starch hydrolysates and/or gelatin to form a gel structure that provides a cross-linked semi-rigid matrix to entrap and/or immobilize the nonaqueous material. In many cases these components are formed as bilayer films to provide water impermeability. These bilayer films may be precast and applied to a food surface as a self-supporting film with the lipid layer oriented toward the component with highest water activity ($w_a$). See, for example, U.S. Pat. No. 4,915,971 and PCT Publication No. 86/00501 (both to Fennema); U.S. Pat. No. 4,880,646 (Lew); and Greener et al. (1989) *Journal of Food Science*, vol. 54, pp. 1393-1399 and 1400-1406.

There are, however, a number of drawbacks associated with these barriers. The hydrocolloids themselves are water soluble and tend to absorb water with time. In addition, some hydrocolloids tend to make the barriers fairly stiff, requiring the addition of a plasticizer to increase flexibility. Furthermore, the thickness of some of these barriers may make their presence perceptible when they are being bitten through.

Another method is to use crosslinked, refined shellac for the matrix, see, for example, U.S. Pat. No. 4,710,228 to Seaborne, or to form microemulsions of fats and water, see, for example, U.S. Pat. No. 4,603,051 to Rubenstein. However, the water permeability of both these types of barriers is fairly high, and the coatings are undesirably thick to overcome this significant permeability.

None of the edible moisture barriers of the art have succeeded in providing all of the requirements for a thin effective moisture barrier that is imperceptible to taste. Accordingly, it is an object of this invention to provide a thin edible moisture barrier consisting essentially of oleaginous materials and wax which is essentially imperceptible to taste and which is useful as a barrier to moisture migration in or out of a food product. Another object includes providing a moisture barrier which is capable of inhibiting the migration of moisture between components of a multi-component food product, particularly between adjacent components having different water activities. Another object of the invention is to provide methods of coating surfaces of a food product with a moisture barrier which are rapid and which are particularly suited to automated production methodologies used in industrial scale food production.

Other objects of the invention will in part be obvious and will in part appear hereinafter.

GENERAL DESCRIPTION

In accordance with the invention, a thin, continuous edible moisture barrier is obtained in a composition consisting essentially of a major portion by weight of edible oleaginous materials (oils and fats) and a minor portion by weight of edible wax. The oleaginous materials have a melting point above the ambient temperature, and the wax is present in an amount sufficient to nucleate solidification of the molten oleaginous materials under quiescent ambient conditions. For example, in one preferred practice of the invention, oleaginous materials useful at ambient temperatures near 70° F. (generally referred to as "room temperature", e.g., about 50°-80° F.), have a melting point of at least about 90° F. In another preferred practice of the invention, the edible oleaginous materials comprise at least about 95% (most preferably at least about 98%) of the composition, and the edible waxes comprise no more than about 5% (most preferably no more than about 2%) of the composition. The moisture barriers of this invention have a permeability value of less than about $0.07 \times 10^{-9}$ gm $cm^{-2} sec^{-1}(cm\ Hg)^{-1}$ cm, and, in the preferred practice of the invention, a permeability value of less than $0.02 \times 10^{-9}$ gm $cm^{-2} sec^{-1}(cm\ Hg)^{-1}$ cm.

In one practice of the invention, the moisture barrier is used to inhibit moisture migration through a surface of a food product. The food product may be cooked, such as by baking, frying or boiling. Alternatively, the food product may be fresh. Illustrative examples of cooked food products include baked goods such as brownies, cookies and crackers; fried goods such as doughnuts, honeybuns, and other raised dough products, and boiled goods such as bagels. Illustrative examples of fresh food products include fruits and vegetables such as apples and cucumbers, and raw food products to be cooked at a later time, such as pizza dough. The moisture barrier of this invention is useful in preventing moisture from entering or exiting the food product, as well as from migrating between adjacent portions of a food product, particularly portions having differing water activities, such as the glazing and dough body of a glazed doughnut, or the filling and crust of a pie.

As used herein, the term "oleaginous materials" is understood to mean fatty acids and their esters (glycerides), and includes molecules commonly referred to as oils and/or fats. Accordingly, oleaginous materials useful in the moisture barrier compositions of this invention can be created by partial hydrogenation of suitable oils or mixtures of oils. Currently preferred oleaginous materials composed of partially hydrogenated oils and useful under ambient conditions of near room temperature (about 70° F.) have a melting point range of about 90° F.-150° F. One such preferred composition consists of 75% soy oil and 25% palm oil, and has a melting point of about 112° F. Another preferred partially hydrogenated oil composition useful at room temperature consists of 90% soy oil and 10% cottonseed oil, and has a melting point of about 113°-117° F. Still another preferred oleaginous material useful at room temperature consists solely of partially hydrogenated soy oil, and has a melting point of about 95°-99° F.

As used herein, "edible waxes" are understood to mean complex mixtures of alcohols, acids and esters formed from long-chain fatty acids and long-chain alcohols, as well as some long-chain alkanes, and are generally plastic solids at room temperature. Accordingly, waxes useful in the moisture barrier compositions of this invention include any suitable edible natural or synthetic wax. In preferred practices of the invention, moisture barrier films contain beeswax, and/or vegetable waxes such as rice bran wax and/or carnauba wax.

As used herein, "barrier" is understood to describe a thin continuous structure that is essentially impermeable to moisture migration through it, and which coats an inner or outer surface of a food product. The barrier may be described as a coating, a film or a membrane.

The moisture barrier composition of this invention is applied to a surface of the food product in a molten state, and is allowed to cool to form a thin, continuous, adherent pliable film that is essentially impermeable to the passage of water or water vapor under natural ambient conditions. The high concentration of oleaginous materials provides a flowable liquid that coats the surface well. The presence of the wax improves the strength of the film and its wettability, and serves to activate the solidification process. The cooled, solid film is thin, continuous and pliable. Using the preferred oleaginous material to wax proportions within the range of at least about 95% (most preferably at least about 98%) oleaginous material to not more than about 5% (most preferably not more than about 2%) wax, the film's organoleptic properties of taste, after-taste and mouth feel will be essentially imperceptible.

Where inhibition of moisture migration between adjacent portions of a food product having different water activities is desired, the moisture barrier composition can be applied to the contacting surface of one (of both) portions and allowed to cool, before the portions are brought together.

In one practice of the invention, the barrier is applied by immersing the food product or simply the surface thereof to be coated into a molten solution of the moisture barrier composition and allowing the coated product to cool. In another practice of the invention, the molten film is applied by brushing or otherwise applying the composition to the desired surface(s) of the product, such as by pan coating, falling film enrobing, water fall, or bed fluidizing. In still another practice of the invention, the film can be applied as an atomized spray, such as by air-brushing.

For a fuller understanding of the nature and objects of the invention, reference should be made to the following detailed description and the accompanying drawings, in which:

DESCRIPTION OF ILLUSTRATED EMBODIMENTS

Figure 1A:
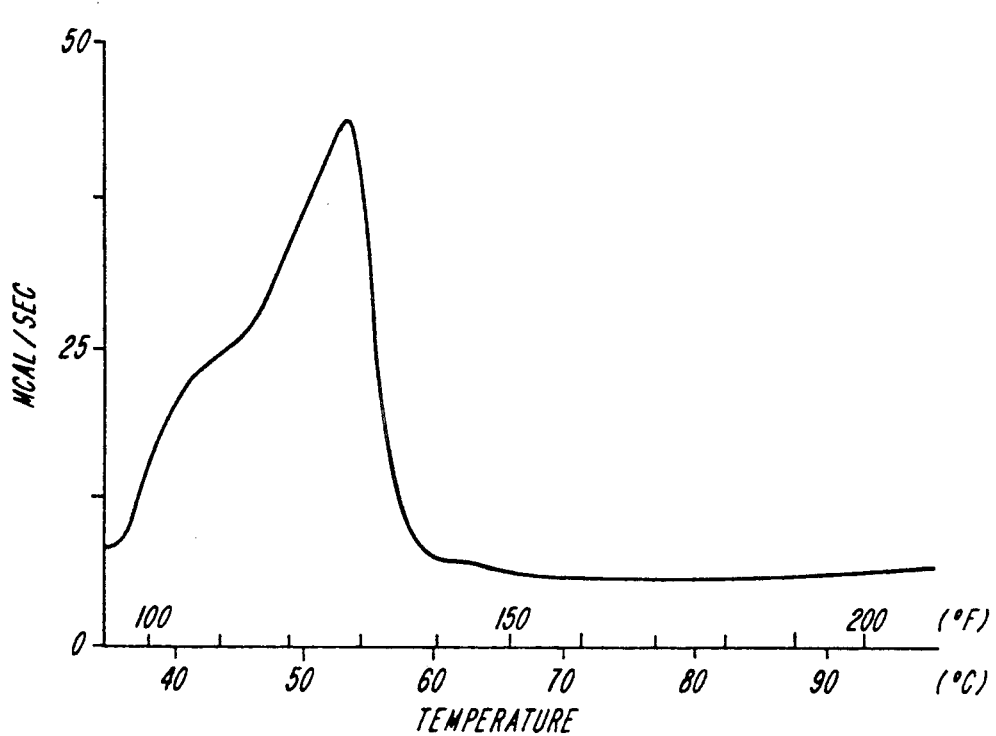
FIGS. 1A and 1B are graphs showing representative heating curves for (A) an oleaginous material useful in the moisture barrier composition of this invention (75% soy oil, 25% palm oil, partially hydrogenated); and (B) the same oleaginous material composition in the presence of 1% rice bran wax.

The moisture barriers of this invention are characterized as soft, flexible and strong enough to remain continuous and not crack on handling, yet that are easily penetrable during consumption. The barriers also spread easily over the food surfaces to which they are applied, being able to coat deep crevices and to bridge small ones to form a continuous film. Accordingly, the barriers have a low surface tension relative to the food surface, yet are able to adhere well to the food product upon cooling. The films also are thin, essentially imperceptible to taste, and are essentially impermeable to the migration of water or water vapor through them. Accordingly, they have a very low water permeability value, (P).

The coating compositions of this invention consist essentially of oleaginous materials and a small percentage of an edible wax. The wax is present in an amount sufficient to nucleate solidification of the oleaginous materials so that a thin continuous barrier forms rapidly under quiescent ambient conditions. In the absence of a small amount of wax, the molten oleaginous material consists of a supercooled liquid at room temperature (see FIGS. 1 and 2, infra). The presence of the wax significantly speeds up the solidification process, as shown by the sharp negative peak in FIG. 2B, infra. The result is a moisture barrier having superior strength and wetting properties under ambient conditions, enabling the barrier to bridge over and seal small crevices in the surface structure of the food product. In preferred embodiments, the composition contains less than 5% edible wax, most preferably less than 2%.

The oleaginous materials are composed of fats (and/or partially hydrogenated oils) which are solid under ambient conditions. At ambient temperatures near room temperature (e.g., in the range of about 50°-80° F.), the oleaginous materials should have a melting point of at least about 90° F. Currently preferred oleaginous materials useful at ambient temperatures near room temperature have a melting point within the range of about 90°-150° F. However, higher melting point ranges may be required under warmer ambient conditions, such as in hotter, more humid climates. Similarly, under cooler ambient conditions, such as a refrigerated environment, oleaginous materials having lower melting points may be required.

Another useful method for characterizing oleaginous materials is by their solid fat index (SFI). The SFI of a material describes the percent of the oleaginous composition that is solid at a given temperature under nonquiescent (agitated) conditions. The preferred compositions useful under ambient conditions of about room temperature (about 70° F.), often have an SFI within the range of about 15%-50% at 70° F., generally about 20-25% at 70° F.

Oleaginous materials useful in the composition of this invention can be obtained using commercially available fats, or by partial hydrogenation of edible oils, also commercially available. The oils can be obtained already partially hydrogenated, or they can be hydrogenated prior to use, using any of the hydrogenation methods well known in the art. Several typical partially hydrogenated oils suited for use in practicing the invention are listed in Table I, below, along with their solid fat indices. Each of these oils is readily available, e.g., from Procter and Gamble Co., Inc., Food Services Division, Cincinnati, Ohio; Hunt-Wesson, Inc., Fullerton, Calif.; and Durkee, Inc. Louisville, Ky. Each of these oils has been partially hydrogenated using conventional means to achieve the appropriate melting temperature properties. Additional information on edible oils and fats can be found in a number of texts well known in the art, including Kirk-Othmer, *Engineering Encyclopedia of Chemical Technology*, John Wiley & Sons, New York, 1978.

TABLE 1

| Identification | 1 | 2 | 3 |
| --- | --- | --- | --- |
| Constituents (%) | 75 soy<br>25 palm | 90 soy<br>10 cottonseed | 100 soy |
| Melting Point, °F. | 112 | 113-117 | 95-99 |
| Solid fat index | | | |
| 50° F. | 43 | 26 | 38 |
| 70 | 24 | 21 | 13 |
| 80 | 20 | — | 18 |

TABLE 1-continued

| Identification | 1 | 2 | 3 |
| --- | --- | --- | --- |
| 92 | 12 | — | 5 |

The wax that is added to the oleaginous composition is present in a quantity sufficient to potentiate solidification of the molten oleaginous materials upon cooling. Useful waxes are edible, and can be animal, mineral or vegetable in composition, and natural or synthetic in origin. These waxes are completely soluble in the molten fat/oil and, in the small quantities used, raise the melting temperature of the fat/oil by only a few degrees. Waxes can be obtained from numerous commercial sources, among them the Frank B. Ross Co., Inc. (Jersey City, N.J.). Several typical examples, well suited for use in the practice of this invention, are listed in Table 2.

TABLE 2

| Wax | Melting Point, °F. |
| --- | --- |
| Rice Bran Wax | 167 |
| Carnauba | 182 |
| Beeswax | 147 |

Additional information on waxes can be found in numerous texts well known in the art, including Kirk-Othmer *Engineering Encyclopedia of Chemical Technology*, John Wiley & Sons, New York, 1978.

The heating and cooling characteristics of molten moisture barriers can be followed using standard differential scanning calorimetry. In this procedure, a small quantity of material is heated (or cooled) at a predetermined rate and the heat which is evolved or absorbed is measured and plotted as a function of temperature.

Water vapor passage through a barrier can be measured using the technique described in ASTM E96-66 (Reapproved 1972). The permeability, P, of a film or membrane is defined as follows:

$$w/tA = P(c/d) \qquad \text{(Eq.1)}$$

where (w) is the weight of water lost in grams, (A) is the area of the membrane in $cm^2$, (t) is the time in seconds, (c) is the difference in water vapor pressure between one side of the membrane and the other in (cm Hg) and (d) is the thickness in cm. The permeability, P, thus has the dimensions $gm\ cm^{-2}\ sec^{-1}(cm\ Hg)^{-1}\ cm$. The water lost also may be expressed in $cm^{-3}$ (STP), but this does not change the resultant values of permeability. The permeability thus can be established as a property of the barrier material and compared with other materials.

The ability to wet a given surface also can be measured where the surface is smooth and the area can be defined precisely. In the case of the surface of a food product such as a doughnut, however, it is more expeditious to observe the spreading of the liquid barrier material on the surface. Similarly, adherence can be judged by bending the doughnut and observing the separation of the barrier.

Taste imperceptibility is judged primarily by a taste test. This is difficult to quantify and reliance must be placed on the integrity of unbiased tasters for the determination of this property.

Several illustrated embodiments are described below, using the methods described herein.

The effects of the addition of a small amount of wax to a partially hydrogenated oil can be seen from data obtained by means of differential scanning calorimetry. Typical data obtained for the combination consisting of 99% of oleaginous material (75% soy, 25% palm oils, partially hydrogenated, melting point 112° F.) and 1% of rice bran wax are shown in FIGS. 1 and 2.

Different samples containing a small amount of the partially hydrogenated oil composition are heated and cooled at a constant rate of 20° C./minute in the presence and absence of wax. In addition, the samples are cooled under quiescent conditions (without agitation). These cooling conditions are typical of those used in a practical industrial coating operation, and the resulting barrier membranes thus are representative of what is expected in such commercial practice.

Figure 1B:
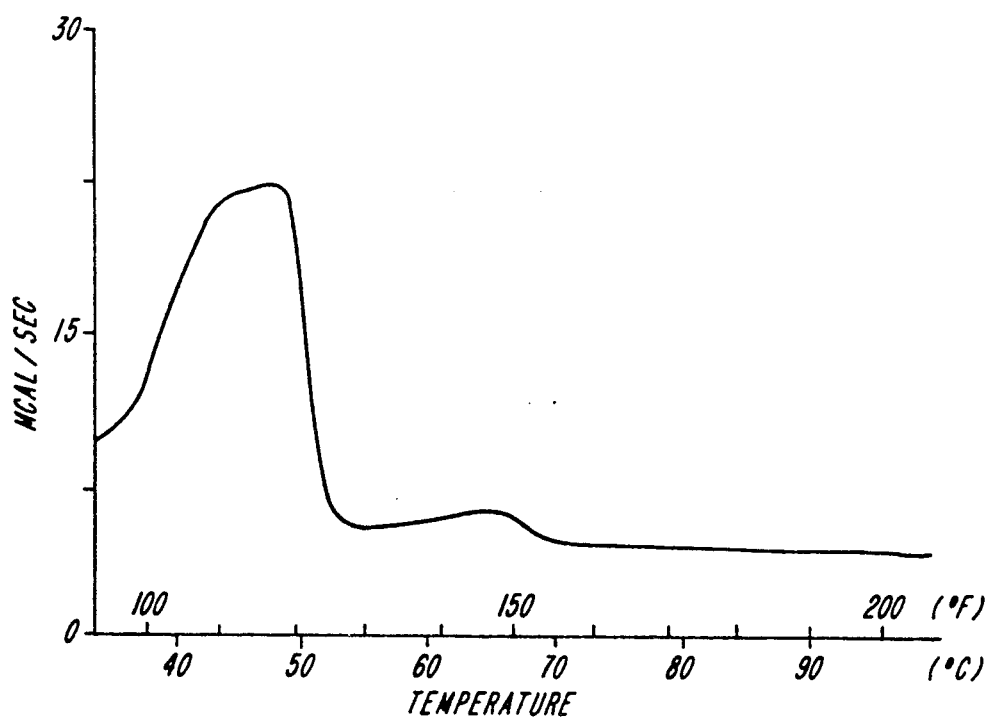
Figure 2A:
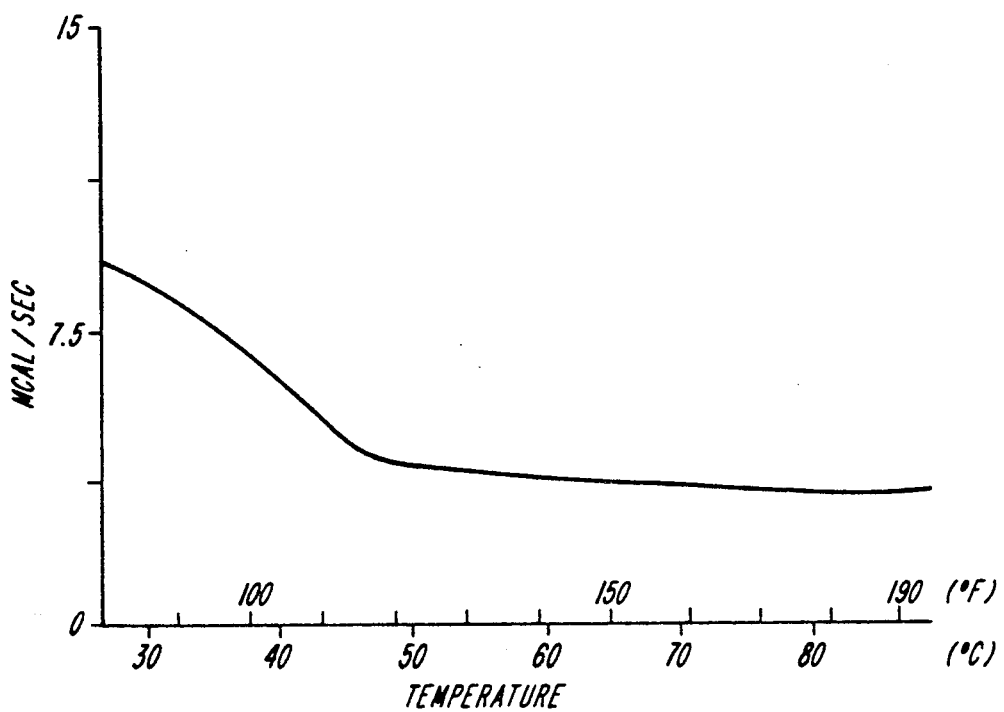
FIGS. 2A and 2B are representative cooling curves for (A) an oleaginous material useful in the moisture barrier composition of this invention (75% soy, 25% palm, partially hydrogenated); and (B) the same oleaginous material in the presence of 1% rice bran wax.
Figure 2B:
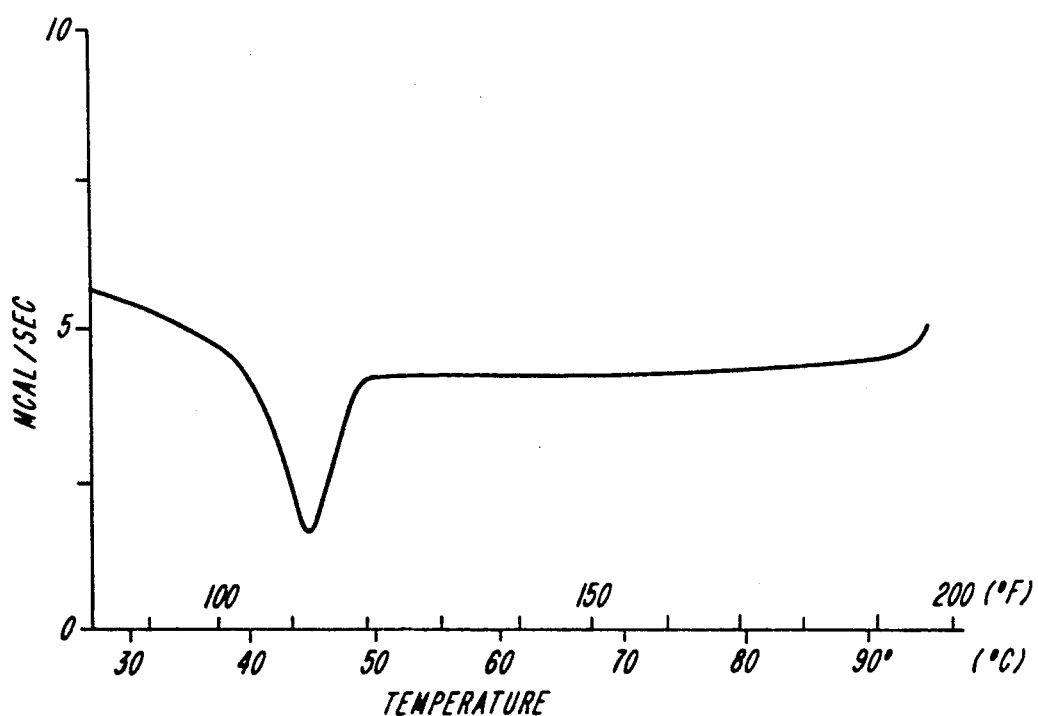

FIG. 1A shows the heating curve for the oil alone. Several distinct peaks are observed, corresponding to the various fatty acids in the oil. The cooling curve for the same oil is shown in FIG. 2A. The characteristic peaks do not appear on cooling, and the resultant material is a supercooled liquid at room temperature. The corresponding heating and cooling curves for the composition in the presence of 1% rice bran wax are shown in FIGS. 1B and 2B. The heating curve, FIG. 1B, is somewhat different from that of the oil alone but has the same general shape as FIG. 1A. The cooling curve for the oil-rice bran combination, FIG. 2B, shows that there is now a distinct heat evolution at 45° C., corresponding to a solidification process. The addition of 1% rice bran wax has helped to nucleate the solidification process on cooling. This solidification strengthens the resultant membrane at room temperature and enhances the bridging of crevices in the substrate material. This enhanced bridging provides the improvement in the resistance to the permeation of water vapor observed in the permeability experiments see Samples 1-11, infra).

The permeability of the barriers and the ability to seal crevices is measured by coating a non-woven fabric having uniform elliptical pores approximately 0.5 mm wide by 2.5 mm long. A known weight of oleaginous material is melted by heating to 200° F., and a predetermined weight of wax is added. At this temperature, the oleaginous material and wax form a single molten phase. A piece of fabric with a measured area and weight then is drawn through the molten oleaginous-wax solution. The temperature of the molten solution is, typically, 150° F. The coating solidifies within a few minutes and is handled easily after five minutes. The permeability of the membrane to water vapor then is measured, using the method described in ASTM E96-66. An equivalent thickness of the barrier is obtained by dividing the weight of the coating by the area and by the density.

In Samples 1-5, the permeability values of moisture barriers containing varying percentages of wax are determined. In these examples, the oleaginous material is composed of partially hydrogenated oils (75% soy oil, 25% palm oil, mpt. 112° F.), and the wax is 100% rice bran wax. The permeability values determined (units gm cm$^{-2}$ sec$^{-1}$ (cm Hg)$^{-1}$ cm) are listed below in Table 3. Note that Sample No. 1 is not the invention.

TABLE 3

| Sample | % Oleaginous Material | % Wax | Permeability (P) |
|---|---|---|---|
| 1 | 100.0 | 0.0 | $1.30 \times 10^{-9}$ |
| 2 | 99.5 | 0.5 | $0.07 \times 10^{-9}$ |

TABLE 3-continued

| Sample | % Oleaginous Material | % Wax | Permeability (P) |
|---|---|---|---|
| 3 | 99.0 | 1.0 | $<0.02 \times 10^{-9}$ |
| 4 | 98.0 | 2.0 | $<0.02 \times 10^{-9}$ |
| 5 | 90.0 | 10.0 | $<0.02 \times 10^{-9}$ |

The sensitivity of the weight loss measurement is such as to limit the accuracy of each permeability measurement to $\pm 0.01 \times 10^{-9}$. For comparison, the average value of permeability listed by Seaborne and by Egberg, supra, for their crosslinked shellac barriers, is of the order of $3 \times 10^{-9}$ gm cm$^{-2}$ sec$^{-1}$ (cm Hg)$^{-1}$ cm.

An examination of the coated fabrics shows that the coating with oil alone does not seal all of the pores in the fabric, and water loss probably occurs by the passage of water vapor through these pores. With the 99.5% oil - 0.5% wax, there are fewer unsealed pores, and the permeability is reduced. With 99% oil - 1.0% wax, all of the pores are sealed and the barrier is impervious. Further additions of wax progressively stiffen the barrier, and by 5% wax the barrier is considered to be too stiff to be imperceptible to the taste. Nonetheless, barriers comprising about 5% wax or even about 10% wax may be useful for certain applications, such as for coating discardable fruit and/or vegetable skins.

In Samples 6-8, the permeability values of moisture barriers containing different waxes are investigated. In these examples, the oleaginous material consists of partially hydrogenated oils (75% soy oil, 25% palm oil, m.p. 112° F.). All barriers are essentially impermeable to moisture migration through the film (P<$0.02 \times 10^{-9}$ gm cm$^{-2}$ sec$^{-1}$ (cm Hg)$^{-1}$ cm). Table 4 lists the permeabilities of barriers containing 1% wax and 99% oleaginous material.

TABLE 4

| Sample | % Oleaginous Material | % Wax | Permeability (P) |
|---|---|---|---|
| 6 | 99.0 | 1.0 rice bran | $<0.02 \times 10^{-9}$ |
| 7 | 99.0 | 1.0 carnauba | $<0.02 \times 10^{-9}$ |
| 8 | 99.0 | 1.0 beeswax | $<0.02 \times 10^{-9}$ |

In Samples 9-11, moisture barrier compositions containing different partially hydrogenated oils are investigated, (99% oil, 1% rice bran wax for all examples). In all cases, the barriers are essentially impermeable, as determined by the limits of the assay (P<$0.02 \times 10^{-9}$ gm cm$^{-2}$ sec$^{-1}$ (cm Hg)$^{-1}$ cm).

TABLE 5

| Sample | % Oleaginous Material | Melting Point °F. | Permeability (P) |
|---|---|---|---|
| 9 | 75:25 soy:palm | 112 | $<0.02 \times 10^{-9}$ |
| 10 | 90:10 soy:cottonseed | 113-117 | $<0.02 \times 10^{-9}$ |
| 11 | 100 soy | 95-99 | $<0.02 \times 10^{-9}$ |

The preferred combination of Sample No. 4, i.e., 99% oleaginous material (75% soy, 25% palm oils, partially hydrogenated, melting point 112° F.), and 1% rice bran wax, is evaluated for moisture impermeability and imperceptability on a food product (glazed doughnuts). Doughnuts made from a yeast-raised dough are used, since these are usually the base for "honey dipped" doughnuts. The molten fat/wax solution is maintained at 150° F. and the doughnut is immersed in the melt and withdrawn immediately. The coated doughnuts are allowed to cool for five minutes on a rack and then immersed into the glazing mixture and allowed to dry. A similar batch of uncoated doughnuts are glazed immediately afterwards to provide a control lot. Each set of glazed doughnuts, coated and uncoated is placed in a box usually used for packaging doughnuts and aged for twelve hours at room temperature. After this aging period, the glaze on the uncoated doughnuts has become syrupy and very sticky to the touch. The glaze on the coated doughnuts remains firm and has not turned to a sticky syrup. The glaze on the coated doughnuts remains firm for three days, at which point the experiment is discontinued.

Similar sets of coated and uncoated doughnuts also are prepared for a taste test. Two panels of six people taste sections of doughnuts cut from coated and uncoated samples and all six panelists agree that both sets of doughnuts taste the same.

A more extensive trial is run by making doughnuts in a commercial doughnut machine, using the same coating compositions as in the experiment above. A batch of doughnuts is prepared, coated, and glazed and then stored at room temperature in conventional packaging. Here also, the glaze remains firm and intact after three days of storage and the experiment is terminated.

The effect of a preferred moisture barrier film composition on baked goods is evaluated, essentially following the procedure for evaluating the barrier on glazed doughnuts, but using a brownie in one instance, and a cracker in another. A brownie has a comparatively high water activity and loses freshness when moisture is lost from the brownie. By contrast, a cracker has a relatively low water activity, and loses freshness as it absorbs water. Using the preferred composition of Sample No. 4, the crackers and brownies are immersed in the molten fat/wax solution and withdrawn immediately. The coated products then cool on a rack (approximately 3-5 minutes). A set of the coated crackers (and a control uncoated set) is then placed in a moisture chamber for 24 hours. During this time the uncoated crackers take in a substantial quantity of water, becoming soggy in texture and weighing more. The coated crackers, by contrast, do not change their texture during this time, and condensation can be seen forming on the film surface.

Similarly, the brownies (coated and uncoated) are each placed in a box for 24 hours. The uncoated brownies lose moisture during this time while the coated brownies are unaffected.

It will thus be seen that the objects set forth above, among those made apparent from the preceding description, are efficiently attained with the edible moisture barrier film as shown and described. It is to be understood that all matter contained in the above description and shown in the drawings is within the scope of the claims appended hereto.

Having described the invention, what is claimed as new and secured by Letters Patent is:

1. A composition useful as a moisture barrier for a food product, said composition consisting essentially of a major portion by weight of edible oleaginous materials having a melting point above the ambient temperature, and a minor portion by weight of edible wax, said edible wax being present in an amount sufficient to nucleate solidification of said oleaginous materials from a molten state under quiescent ambient conditions, and said composition being adapted for forming a thin, continuous, adherent, pliable barrier on a surface of the food product and for being essentially impermeable to the passage of water vapor through the barrier under ambient conditions.

2. A composition according to claim 1 further comprising oleaginous materials having a melting point of at least about 90° F.

3. A composition according to claim 1 further comprising oleaginous materials having a melting point within the range of about 90°-150° F.

4. A composition according to claim 1 further consisting essentially of at least about 95% of said edible oleaginous materials and not more than about 5% of said edible wax.

5. A composition according to claim 1 further consisting essentially of at least about 98% of said edible oleaginous materials and not more than about 2% of said edible wax.

6. A composition according to claim 1 further comprising a permeability value, P, of less than of about $0.07 \times 10^{-9}$ gm cm$^{-2}$ sec$^{-1}$ (cm Hg)$^{-1}$ cm.

7. A composition according to claim 1 further comprising a permeability value, P, of less than about $0.02 \times 10^{-9}$ gm cm$^{-2}$ sec$^{-1}$ (cm Hg)$^{-1}$ cm.

8. A composition according to claim 1 wherein said edible oleaginous materials are partially hydrogenated oils.

9. A composition according to claim 8 wherein said partially hydrogenated oils are selected from the group consisting of soy oil, palm oil, cottonseed oil, and combinations thereof.

10. A composition according to claim 9 wherein said partially hydrogenated oils comprise 90% soy oil and 10% cottonseed oil.

11. A composition according to claim 9 wherein said partially hydrogenated oils comprise 75% soy oil and 25% palm oil.

12. A composition according to claim 1 wherein said wax is selected from the group consisting of rice bran, carnauba, beeswax, and combinations thereof.

13. A food product having a surface coated with a barrier, said barrier being substantially impermeable to moisture and consisting essentially of a major portion by weight of edible oleaginous materials having a melting point above the ambient temperature, and a minor portion by weight of edible wax, said wax being present in an amount sufficient to nucleate solidification of said oleaginous materials from a molten state under quiescent ambient conditions.

14. A food product according to claim 13 wherein said oleaginous materials have a melting point of at least about 90° F.

15. A food product according to claim 13 wherein said barrier consists essentially of at least about 95% of said edible oleaginous materials and not more than about 5% of said edible wax.

16. A food product according to claim 13 wherein said barrier consists essentially of at least about 98% of said edible oleaginous materials and not more than about 2% of said edible wax.

17. A food product according to claim 13 having a first and second portion, said first and second portions having two, different water activities, wherein said barrier forms a barrier to moisture migration between said first and second portions.

18. A food product according to claim 13 wherein said barrier has a permeability value, P, of less than about $0.07 \times 10^{-9}$ gm cm$^{-2}$ sec$^{-1}$ (cm Hg)$^{-1}$ cm.

19. A food product according to claim 18 wherein said barrier has a permeability value, P, of less than abut $0.02 \times 10^{-9}$ gm cm$^{-2}$ sec$^{-1}$ (cm Hg)$^{-1}$ cm.

20. A food product according to claim 13 having a cooked portion.

21. A food product according to claim 20 wherein said cooked portion is baked.

22. A food product according to claim 21 wherein said baked portion is brownie.

23. A food product according to claim 21 wherein said baked portion is a cracker.

24. A food product according to claim 20 wherein said cooked portion is fried.

25. A food product according to claim 24 wherein said fried portion is a doughnut.

26. A food product according to claim 13 wherein said barrier is sufficiently thin so as to be substantially organoleptically imperceptible.

* * * * *